United States Patent
Spector

(10) Patent No.: US 7,206,754 B1
(45) Date of Patent: Apr. 17, 2007

(54) SYSTEM FOR ISSUING SHORT LIFE COUPONS OR OTHER PROMOTIONAL DEVICES

(76) Inventor: Donald Spector, 420 E. 23rd St., New York, NY (US) 10010

( * ) Notice: Subject to any disclaimer, the term of this patent is extended or adjusted under 35 U.S.C. 154(b) by 1091 days.

(21) Appl. No.: 09/589,313

(22) Filed: Jun. 7, 2000

(51) Int. Cl.
G06Q 30/00 (2006.01)

(52) U.S. Cl. .............................. 705/14; 705/1; 705/10; 705/27; 725/23; 725/110; 725/112; 725/113; 348/14.01; 348/14.05

(58) Field of Classification Search .................... 705/1, 705/10, 14, 27; 725/23, 110, 112, 113; 348/14.01, 348/14.05, 1
See application file for complete search history.

(56) References Cited

U.S. PATENT DOCUMENTS

| 5,176,224 A | 1/1993 | Spector |
| 5,249,044 A * | 9/1993 | von Kohorn ................. 725/23 |
| 5,287,181 A | 2/1994 | Holman |
| 5,500,681 A | 3/1996 | Jones |
| 5,978,013 A | 11/1999 | Jones |
| 6,298,331 B1 * | 10/2001 | Walker et al. ................. 705/15 |
| 6,336,099 B1 * | 1/2002 | Barnett et al. ................. 705/14 |

FOREIGN PATENT DOCUMENTS

WO          WO 95/16971         *   6/1995

OTHER PUBLICATIONS

Richard Tedesco, "NBC goes interactive with fall lineup" Broadcasting and Cable, Jun. 30, 1997, ABI/INFORM Global p. 79.*

* cited by examiner

*Primary Examiner*—Raquel Alvarez
(74) *Attorney, Agent, or Firm*—Diehl Serville LLC; Glen M. Diehl

(57) ABSTRACT

An improved short life coupon system which allows a television viewer to select discount or promotional coupons while viewing a television commercial. Coupon information relating to the commercial is sent to a central station which also contains up-to-date point-of-sale information. This information is analyzed by the central station so that the coupon can be specifically designed to satisfy the viewer and maximize sales.

12 Claims, 1 Drawing Sheet

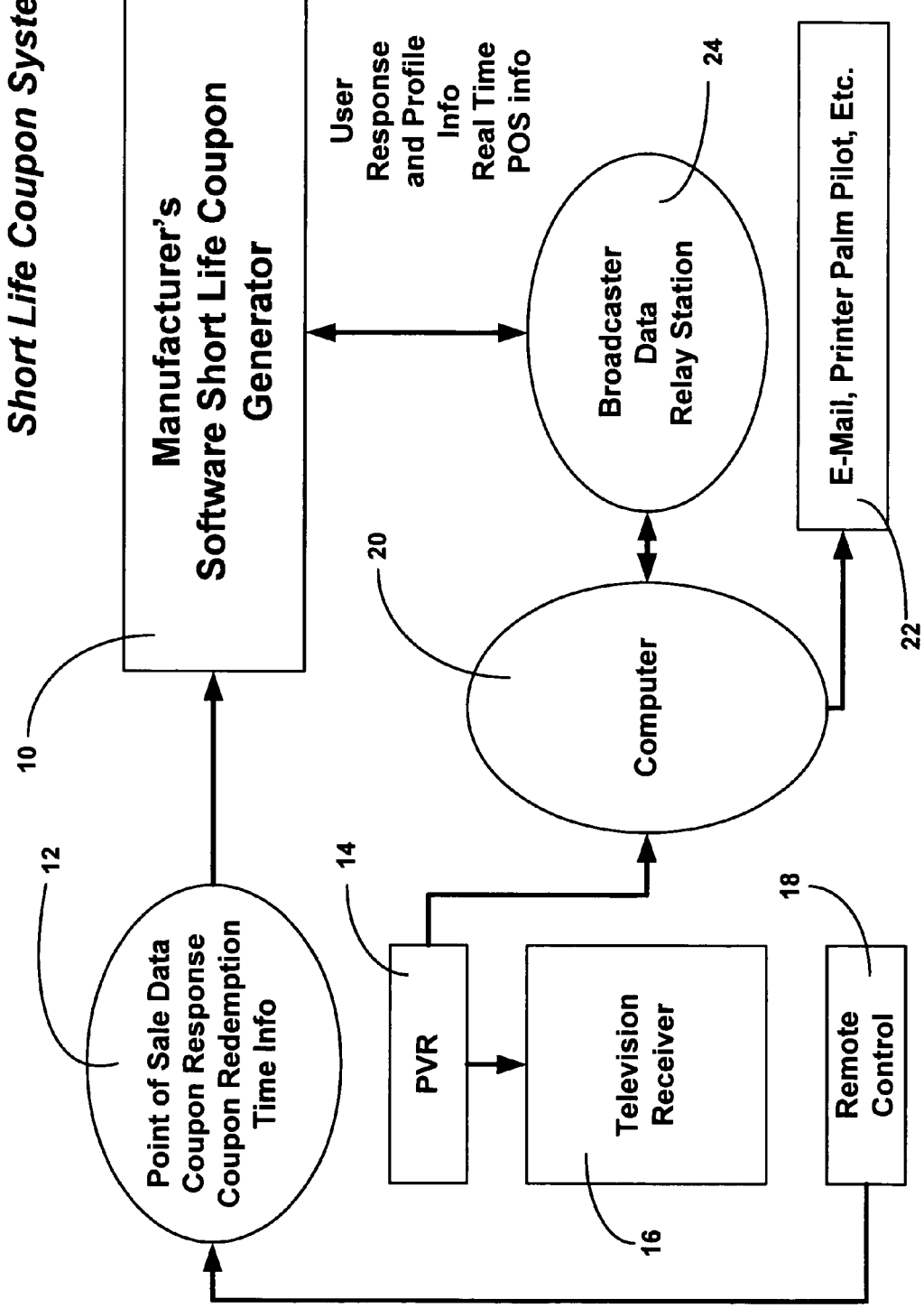

SYSTEM FOR ISSUING SHORT LIFE COUPONS OR OTHER PROMOTIONAL DEVICES

FIELD OF THE INVENTION

This invention relates generally to systems for generating merchandising coupons, such as discount or promotional coupons which, when issued to a consumer, entitle the consumer to specified discounts or other benefits on those items identified by the coupons. More particularly, the instant invention is directed to a television driven short life coupon system which allows the manufacturer of a particular product to instantaneously modify issued coupons based on redemption information and point-of-sale information.

BACKGROUND OF THE INVENTION

A merchandising coupon is often referred to as a "cents-off" or discount coupon or alternatively a promotional coupon. The holder of the coupon, when purchasing the product identified on the coupon from the retailer, is given a specified discount or other promotional benefit. Such coupons fall into two basic classes those printed and put into distribution by manufacturers, and those which retailers print for use in their stores.

The majority of merchandising coupons are authorized by the manufacturer of the product so that the manufacturer is required to pay to the retailer the face value of each coupon redeemed, plus certain handling charges. For example, on occasion the Coca-Cola Company runs ads which include a coupon offering 25 cents towards the purchase of a pack of "Coca-Cola" bottles. The retailer who accepts this coupon gives the purchaser of the pack a 25 cent reduction on the market price thereof. The retailer is then entitled to recover from the Coca-Cola Company this 25 cent discount, plus seven cents for handling costs (or whatever other handling charge is indicated).

Despite the high cost of merchandising coupon transactions, the volume of coupon traffic has risen over the years to a phenomenal level. Though only a fraction of the many billions of coupons which are distributed are actually put to use by shoppers, the number of coupons which are redeemed still runs into the billions.

Experience has shown that cents-off coupons and promotional coupons constitute a cost-effective promotional technique for stimulating consumers to try out a new product or to switch brands. Moreover, when sales of a given brand are flagging, merchandising coupons often serve to revive and even increase such sales. Merchandising coupons therefore benefit the consumer, the manufacturer and the retailer.

While in some instances coupons accepted by the retainer are redeemed by sending them directly back to the company making the product most coupons first go through a clearing house where, after the coupons have been manually sorted, they are shipped by the clearing house to the respective manufacturers who then invoice the money payable to the clearing house.

With existing procedures, the manufacturer has little control over the number or value of coupons redeemed. By statistical analysis of previous coupon promotions, the manufacturer can make a projection of anticipated redemptions. However, if a coupon was issued for a larger than usual discount and the redemption rate was higher than expected, the manufacturer may then incur a greater promotional expense than projected.

Also, with the existing procedures, the time elapsing between issuance and redemption of a coupon can be many months, particularly if the coupon carries an expiration date which gives the shopper a long term in which to use the coupon. This makes planning for future promotions difficult, for information on coupon redemptions in previous promotions is slow to arrive.

Quite distinct from these problems is the failure of many shoppers to take advantage of merchandising coupons. While a shopper may save coupons mailed to him or her or may clip and file coupons appearing in newspapers and magazines, the shopper often forgets to take them along when going shopping and therefore will not be induced to make a discretionary purchase or switch brands. Typically, a consumer will receive in the mail a merchandising coupon, say, for a new hair shampoo; but it will be several days before the next shopping trip, and by that time the shopper may have forgotten about the coupon and will therefore purchase the usual brand.

U.S. Pat. No. 5,176,224 issued to Donald Spector on Jan. 1, 1993, the inventor of the instant application, proposed one unique solution to the foregoing coupon distribution problem. In this patent, Mr. Spector proposed a controlled-loop computer-controlled merchandising coupon system where a coupon printer-dispenser would be installed at each supermarket, making it possible for a shopper to receive a merchandising coupon entitling him or her to a specified discount on the product identified in the coupon. Advantageously, this patent also disclosed that the manufacturer would be provided with a readout of the discount coupon transactions so that the manufacturer could subsequently alter the discount amount on the basis of the coupons being presented by the consumer.

Another coupon distribution system is described in U.S. Pat. No. 5,249,044, issued to Harry Von Kohorn on Sep. 28, 1993. This patent describes a system for generating product coupons at remote locations, including a consumer's home. The system, includes an apparatus for receiving and storing product information signals broadcast from a central television broadcast location. The apparatus is connected to a consumer's television at a remote location, which television includes a coupon generating unit. When the consumer views a product of interest, the system can be activated, and if available the consumer can have a discount coupon printed at his or her home for later presentation to a retail outlet. The possibility to receive a coupon at home was an advance in the art but still did not give the manufacturer the ability to monitor coupon distribution and tailor such distribution to enhance particular product sales. Other similar patents in this area include U.S. Pat. Nos. 5,500,681 and 5,978,013. The teachings of the '044, '681 and '013 patents are incorporated herein by reference.

A further improvement is disclosed in U.S. Pat. No. 5,287,181. In this system, coupon related data is encoded in a television signal transmission, which data is decoded and displayed on the television screen. Upon viewing the indicia on the television screen, the user can manually and selectively extract the coupon-related data from the television signal transmission. After an optional editing function, the extracted coupon-related data is stored on a recording medium such as a magnetically striped card, for subsequent readout and redemption. This system also envisions that consumer information would be provided to the manufacturer, upon redemption of the coupons. In this embodiment the manufacturer would be able to determine results in the amount of usage of the coupons, the demographics of usage and detailed information about the consumer.

This system however, does not show or suggest a method or apparatus with which a manufacturer could make decisions regarding coupon usage on a real time basis and tailor coupon issuance accordingly.

An additional problem with the prior art coupon delivery systems via television is the recent introduction of Personal Video Recorders (PVR) which consist of a set-top box equipped with a large capacity hard drive. Incoming television signals are digitalized and stored on the hard drive, allowing the consumer to view replays, catch-up on shows already in progress, index and select recorded shows and most importantly, eliminate commercial advertisements. The ability of a consumer to eliminate commercials is a major problem for manufacturers due to the large amounts of money currently spent by manufacturers on advertising, and the possibility that those ads will not be watched by consumers.

It is therefore one object of this invention to provide an incentive for consumers equipped with PVR's to view commercials by offering product discount coupons tied to a specific commercial.

It is a further object of this invention to provide instant coupon feedback information to a manufacturer regarding their coupon discount program.

It is a still further object of this invention to provide coupon feedback information to a manufacturer before the coupon is issued for redemption.

It is another object of this invention to allow a manufacturer to tailor it's coupon discount program in real time based on point-of-sale information, thereby allowing manufacturers to maximize profits and sales.

SUMMARY OF THE INVENTION

In accordance with the invention, a television receiver is located at a viewer's premises, the television receiver including a remote control unit, and may include a Personal Video Recorder (PVR) or other device capable of sending data over a telephone line or other communications highway.

Located at the viewer's premises is also a data processing terminal, such as a Personal Computer, which responds to a request for a product discount coupon via the television remote control. In response to a coupon request, information is transmitted by the personal computer to a central station maintained by the broadcaster of the television program.

The broadcaster central station then transmits a coupon request to a manufacturer's coupon generator station. Advantageously, this request will include information identifying the product of interest and may include viewer profile information.

The coupon request information is received at the manufacturer's coupon generator and compared with previously stored point-of-sale information, i.e., how the product is selling in a particular geographic area or to a defined consumer group.

The received information and the previously stored information is then analyzed to permit the manufacturer to issue a coupon or other promotional device tailored to the consumer and designed to maximize sales.

BRIEF DESCRIPTION OF THE DRAWING

In the Drawing:

FIG. 1 illustrates a block diagram of the inventive system for issuing short life coupons, or other promotional devices.

DESCRIPTION OF THE INVENTION

Referring now to FIG. 1, there is shown one embodiment of the instant invention.

Television receiver 16 is located at a consumer location. Attached thereto is a remote control device 18 as well as a Personal Video Recorder (PVR) 14. It is to be understood that the PVR could be replaced by any other device capable of transmitting and receiving data over a telephone line or other communications highway. As described above, the PVR (or equivalent) can store and replay video presentations, including the ability to eliminate commercials. The PVR is connected to computer 20, which can be remote or located at the consumer site. It is to be understood that PVR 14 could also be replaced with a standard set-top box with the ability to communicate with computer 20.

Computer 20 also communicates with Broadcaster Data Relay Station 24 and can provide e-mail or data transfer to a consumer's printer, Palm Pilot or equivalent and/or other communication devices as shown at 22.

The Broadcaster Data Relay Station 24 also communicates with the Manufacturer's Software Short Life Coupon Generator 10 to provide user response and profile information as well as time information i.e., what product is being shown when a consumer is viewing a commercial.

It is to be understood that a short life coupon means a discount coupon that is valid for a relatively short predetermined period of time and valid only for a specific product or products. This term can also include other promotional devices which are distinct from discount coupons.

In operation, television receiver 16 connected to PVR 14, or other set-top box) displays a commercial on the screen. An interested customer sees a commercial and decides to request a Short Life Coupon. The customer then pushes a button on the remote control to request the Short Life Coupon. In order to induce the customer to view the commercial in this example, the customer would not be able to request the coupon until the end of the commercial.

The PVR (or set-top box or other communications device) sends a request for a coupon (time related to the specific commercial) through a phone line (or cable) and through a pass through line in the home computer 20 to the Broadcaster Data Relay Station 24. This station bounces back coded appropriate demographic information on the user (profiles and time) to the Manufacturer's Software Short Life Coupon Center 10.

Center 10 is a data bank with software that also receives up to the minute point-of-sale (POS) information on the products being offered, as well as information on coupon responses and redemptions as shown at 12. The program in the Manufacturer's Short Life Coupon Generator Station 10 analyzes this information to provide maximum yield in moving product or services.

The Manufacturer's Coupon Generator 10, might make different offers in different localities depending on local conditions. For example, if the weather is cold during the summer and Coke is not moving well, it may offer a bigger discount in that location). Its offers can be location driven and are related to product sales of either a store, or a series of stores in one location. The Manufacturer's Coupon Generator may also be hooked into a retailer's promotion in an area. Unlike many other coupons a Short Life Coupon will usually be of higher value and may only be honored by a specific retailer in one region. A person who is going out of business may contact a manufacturer and make a deal to "Blow Out" merchandise at dramatically reduced prices. Perishable goods that are about to expire might also be severely discounted.

The Manufacturer's Coupon Generator 10 might also look at the customer's profile and realize that he or she only responds to big offers. In that instance, the manufacturer might choose to offer a shorter time length for this person's coupons but with a bigger discount, or might say that the service is unavailable and switch the consumer to a related product that the company sells. If the products being offered are selling well, offers for new products or other products might be offered.

The Coupon Generator 10 sends these coupons to the user's personal computer (or stand-along box) where they can be printed or electronically stored for use at a retailer (i.e., a customer can display his electronic coupon in the store from the screen of his cell phone, Palm Pilot, or other personal electronic device).

In certain circumstances, it is envisioned that these discounts can automatically be filled online, if so requested. Therefore, a company might make a special limited offer and not even print a coupon but have the discount applied automatically when the product is purchased via an online participating partner.

The redemption rate of the Short Life Coupons is factored into the Coupon's Generator's Point of Sale data and adjusts the discounts and offers accordingly.

The Short Life Coupon system is totally interactive with sales data at specific times and always allows the manufacturer (or retailer) to know exactly where he is (without having overhang of millions of dollars of unused coupons).

The system also allows a manufacturer to have a significant advantage over his competition in the marketplace.

Because larger than usual valuable discounts will be offered, it also gives people a reason to want to watch commercials which is important for consumers using a PVR.

It is also envisioned that trivia questions, for example could be printed on the coupons, which require answers from the consumer. In this way, the coupons could also be used as a sweepstakes vehicle.

The foregoing description is only illustrative of the invention. Various alternatives and modifications scan be devised by those skilled in the art without departing from the spirit of the invention. Accordingly, the present invention is intended to embrace all such alternatives, modifications and variances which fall within the scope of the appended claims.

I claim:

1. A system for generating discount or promotional coupons, comprising:
  a television receiver located at a viewer's premises, said television receiver including and a remote control unit;
  a personal video recorder (PVR) that allows a viewer to select a coupon for a product while it is advertised via a commercial that is displayed by the television receiver, said selection occurring via the remote control unit, and said PVR transmitting the request for said coupon to a data processing device, which transmits the request to a broadcaster central station;
  means included within said broadcaster central station for transmitting to a manufacturer coupon generator station a coupon request, which request includes specific information regarding the product of interest;
  first means included within said manufacturer's coupon generator station for receiving said specific information regarding said product of interest, said manufacturer's coupon generator station also having available up to the minute point-of-sale information on the product of interest and coupon responses and redemptions regarding said product, and;
  second means included within said manufacturer's coupon generator station for analyzing said specific information regarding said product of interest, and said point-of-sale information and coupon responses and redemptions and issuing a coupon to said viewer based on said analyzed information; wherein the data processing device receives and stores the coupon issued to said viewer.

2. A system in accordance with claim 1, wherein said request for a coupon includes information specifying a time when said coupon is requested.

3. A system in accordance with claim 2 wherein said first means included within said manufacturer's coupon generator station further includes means for comparing said time when said coupon is requested with a time when commercials for said product of interest were broadcast.

4. A system in accordance with claim 1 wherein said second means issues said coupon at a value intended to provide maximum sales of said product of interest.

5. A system in accordance with claim 1 wherein said second means issues said coupon at a value depending on the geographic location of said viewer.

6. A system in accordance with claim 1 wherein said coupon is a short life coupon.

7. A system in accordance with claim 1 wherein said coupon, upon issuance, is printed for said viewer by a printer attached to said data processing device.

8. A system in accordance with claim 1 wherein said coupon, upon issuance, is electronically stored by said data processing device.

9. A system in accordance with claim 8 wherein said electronically stored coupon can subsequently be printed or redeemed electronically by said viewer.

10. A system in accordance with claim 1 wherein said coupon includes inquiries which may be electronically or manually answered by said viewer as part of a contest.

11. A system in accordance with claim 1 wherein said transmitting means includes means for assembling and transmitting consumer profile information along with said information regarding the product of interest.

12. A system in accordance with claim 1 wherein said coupon is a promotional coupon.

* * * * *